US012561829B2

(12) United States Patent
Chang et al.

(10) Patent No.: US 12,561,829 B2
(45) Date of Patent: Feb. 24, 2026

(54) METHOD, COMPUTER DEVICE, AND COMPUTER PROGRAM FOR PROVIDING HIGH-QUALITY IMAGE OF REGION OF INTEREST BY USING SINGLE STREAM

(71) Applicant: NAVER CORPORATION, Seongnam-si (KR)

(72) Inventors: Joon-kee Chang, Seongnam-si (KR); SungHo Kim, Seongnam-si (KR); SungTaek Jo, Seongnam-si (KR); Woo-sik Byun, Seongnam-si (KR); JaeChul Ahn, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 85 days.

(21) Appl. No.: 18/493,416

(22) Filed: Oct. 24, 2023

(65) Prior Publication Data

US 2024/0056549 A1 Feb. 15, 2024

Related U.S. Application Data

(63) Continuation of application No. PCT/KR2022/005936, filed on Apr. 26, 2022.

(30) Foreign Application Priority Data

Apr. 26, 2021 (KR) ........................ 10-2021-0053517

(51) Int. Cl.
*G06T 7/70* (2017.01)
*G06T 7/11* (2017.01)
*G06V 10/25* (2022.01)

(52) U.S. Cl.
CPC .................. *G06T 7/70* (2017.01); *G06T 7/11* (2017.01); *G06V 10/25* (2022.01); *G06T 2207/30242* (2013.01); *G06V 2201/07* (2022.01)

(58) Field of Classification Search
None
See application file for complete search history.

(56) References Cited

U.S. PATENT DOCUMENTS

2020/0053435 A1* 2/2020 Denoual .......... H04N 21/23439
2023/0067541 A1* 3/2023 Boyce .................. H04N 19/167

FOREIGN PATENT DOCUMENTS

JP       2013229806 A    11/2013
JP       2014183353 A     9/2014
JP       2016009925 A     1/2016
KR        100827198 B1    4/2008
KR     1020170118463 A   10/2017

(Continued)

OTHER PUBLICATIONS

Office Action issued in corresponding Japanese patent application No. 2023-565548, dated Dec. 24, 2024.
ISR issued in PCT/KR2022/005936, mailed Aug. 18, 2022.

*Primary Examiner* — Omar S Parra
(74) *Attorney, Agent, or Firm* — Greer Burns & Crain Ltd.

(57) ABSTRACT

An image providing method includes configuring a region of interest in an original image; generating a high-quality image and a low-quality image by using the original image; reconstructing the region of interest and a remaining region other than the region of interest by using the high-quality image and the low-quality image; and transmitting the reconstructed region of interest and the reconstructed remaining region via a single stream.

16 Claims, 11 Drawing Sheets

(56)     References Cited

FOREIGN PATENT DOCUMENTS

| | | | |
|---|---|---|---|
| KR | 101964126 | B1 | 4/2019 |
| KR | 1020200017310 | A | 2/2020 |
| KR | 1020200111410 | A | 9/2020 |
| WO | WO-2019034803 | A1 * | 2/2019 ........... H04N 21/816 |

* cited by examiner

600

610

601

ROI

600

Resolution of original video (2160x3840)

Generation of high definition

700

High definition (1440x2560)

800

Low definition (960x1280)

Generation of low definition

600

Resolution of original video (2160x3840)

METHOD, COMPUTER DEVICE, AND COMPUTER PROGRAM FOR PROVIDING HIGH-QUALITY IMAGE OF REGION OF INTEREST BY USING SINGLE STREAM

CROSS-REFERENCE TO RELATED APPLICATIONS

This is a continuation application of International Application No. PCT/KR202/005936, filed Apr. 26, 2022, which claims the benefit of Korean Patent Application No. 10-2021-0053517, filed Apr. 26, 2021.

BACKGROUND OF THE INVENTION

Field of Invention

The following description relates to technology for providing a high-definition video service.

Description of Related Art

A rapid increase in the number of ultra-high speed communication network users enables the development of new services and diversification of service items through a communication network. A moving picture service is among those services using such communication network.

For example, "apparatus for providing a moving picture link service and method thereof" of Korean Patent Registration No. 10-0827198 (registered on Apr. 25, 2008) describes technology for providing a moving picture link service that that enables a user to view a linked moving picture on the Internet while moving using a mobile communication terminal.

A moving picture service system using a client-server method is in a structure of transmitting real-time moving picture streaming from an encoder server to a client and uses a method of encoding a video input from a camera and transmitting the encoded video to a client with audio data in real time in a live transmission environment.

BRIEF SUMMARY OF THE INVENTION

One or more example embodiments of the present invention relate to a method and a system that may provide a high-definition video for a region of interest (ROI) and may provide a low-definition video for the remaining region other than the ROI using a single stream in a single transmission environment.

According to at least one example embodiment, there is provided a video providing method executed in a computer device, wherein the computer device includes at least one processor configured to execute computer-readable instructions included in a memory, and the video providing method includes setting, by the at least one processor, a region of interest (ROI) in an original video; generating, by the at least one processor, a high-definition video and a low-definition video using the original video; reconstructing, by the at least one processor, the ROI and a remaining region other than the ROI using the high-definition video and the low-definition video; and transmitting, by the at least one processor, the reconstructed ROI and remaining region using a single stream.

According to one aspect of the example embodiment, the video providing method may provide a video reconstructed using the high-definition video and the low-definition video in a single transmission environment using a single camera.

According to another aspect, the generating may include setting a maximum resolution of a transmission video; determining a high-definition resolution and a low-definition resolution based on the maximum resolution; and generating a video of the high-definition resolution and a video of the low-definition resolution through scaling of the original video.

According to still another aspect, the reconstructing may include extracting, from the high-definition video, a high-definition grid region that is a portion corresponding to the ROI; extracting, from the low-definition video, a low-definition grid region that is a portion corresponding to the remaining region; and reconstructing the high-definition grid region and the low-definition grid region as a transmission video.

According to still another aspect, the reconstructing may further include generating coordinate information capable of distinguishing the ROI and the remaining region, and the transmitting may include transmitting the reconstructed video and the coordinate information to an encoder server for relay to a player.

According to still another aspect, the reconstructed transmission video may be separated into the ROI and the remaining region and recombined at the same ratio and then played back in the player that receives the single stream.

According to still another aspect, the setting may include providing the original video as a grid video that is a video in a grid form in which the video is segmented into a plurality of regions; and setting a specific region selected from the grid region as the ROI.

According to still another aspect, the providing may include providing a video in a grid form selected by a transmission end manager from among a plurality of grid forms.

According to still another aspect, the grid form may be determined based on a type of the original video or the number of or locations of objects in the original video.

According to still another aspect, the setting may include setting, as the ROI, a region that includes an object corresponding to a predetermined category or type through object detection for the original video.

According to at least one example embodiment, there is provided a computer-program stored in a computer-readable recording medium to perform the video providing method on the computer device.

According to at least one example embodiment, there is provided a computer device including at least one processor configured to execute computer-readable instructions included in a memory, wherein the at least one processor is configured to set a region of interest (ROI) in an original video, to generate a high-definition video and a low-definition video using the original video, to reconstruct the ROI and a remaining region other than the ROI using the high-definition video and the low-definition video, and to transmit the reconstructed ROI and remaining region using a single stream.

According to some example embodiments, since a high-definition video may be serviced at a relatively low bitrate by providing a high definition for a region of interest (ROI) and by providing a low definition for a remaining region other than the ROI using a single stream in a single transmission environment, it is possible to ensure quality of service (QoS) and quality of experience (QoE).

DETAILED DESCRIPTION OF THE INVENTION

Hereinafter, some example embodiments will be described with reference to the accompanying drawings.

Example embodiments relate to technology for providing a high-definition video service.

Example embodiments including disclosures herein may provide a high-definition video for a region of interest (ROI) in a video and may provide a low-definition video for a remaining region of the video other than the ROI using a single stream.

A video providing system according to the example embodiments may be implemented by at least one computer device and a video providing method according to the example embodiments may be performed by at least one computer device included in the video providing system. Here, a computer program according to an example embodiment may be installed and executed on the computer device, and the computer device may perform the video providing method according to the example embodiments under control of the executed computer program. The aforementioned computer program may be stored in a computer-readable recording medium to computer-implement the video providing method in conjunction with the computer device.

Figure 1:
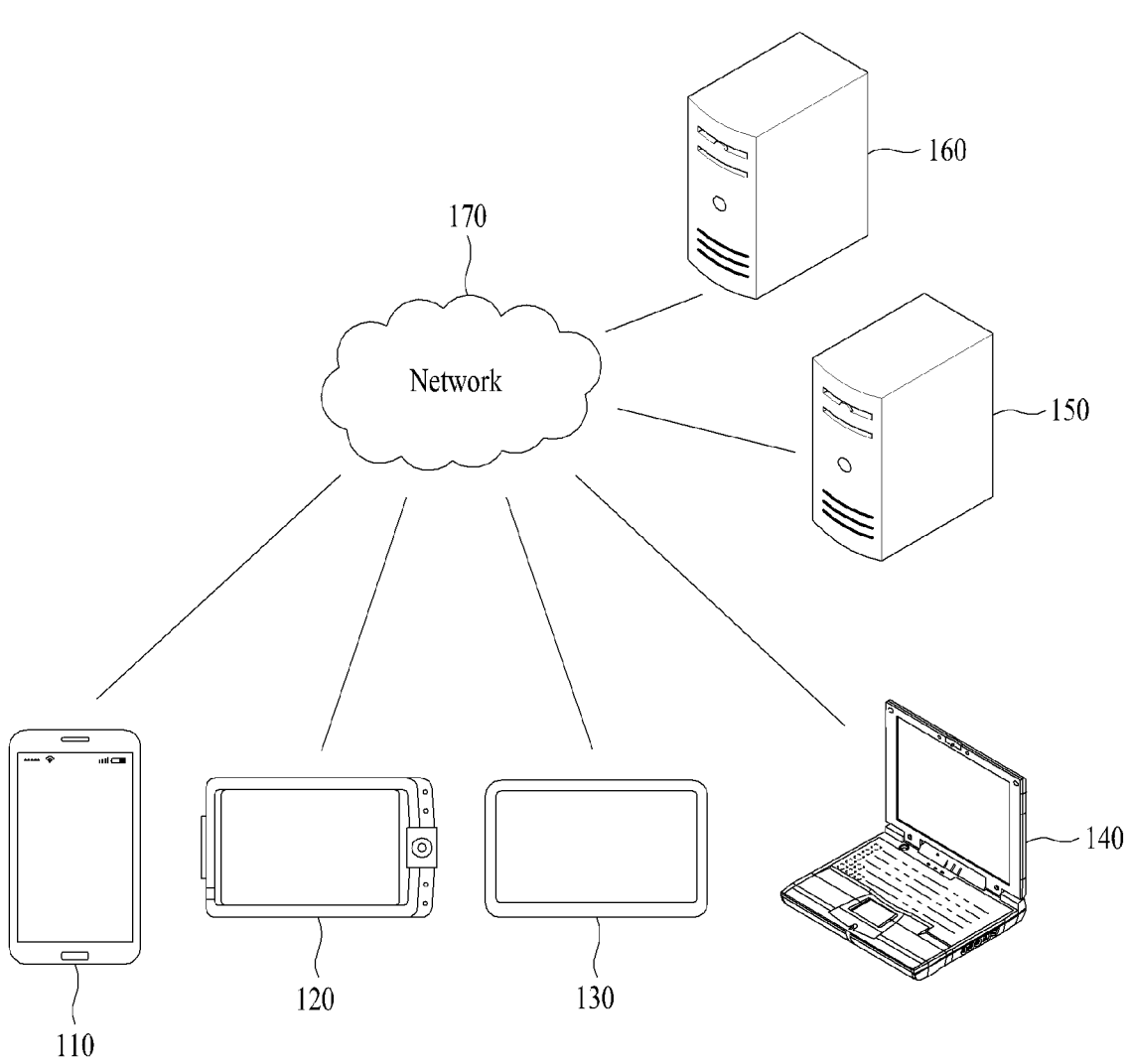
FIG. 1 is a diagram illustrating an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the network environment of FIG. 1 is provided as an example only among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer devices capable of communicating with other electronic devices 120, 130, and 140 and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service (e.g., a video service, a content providing service, a group call service, a messaging service, a mail service, a social network service, a map service, a translation service, a search service, etc.) to the plurality of electronic devices 110, 120, 130, and 140 connected over the network 170.

Figure 2:
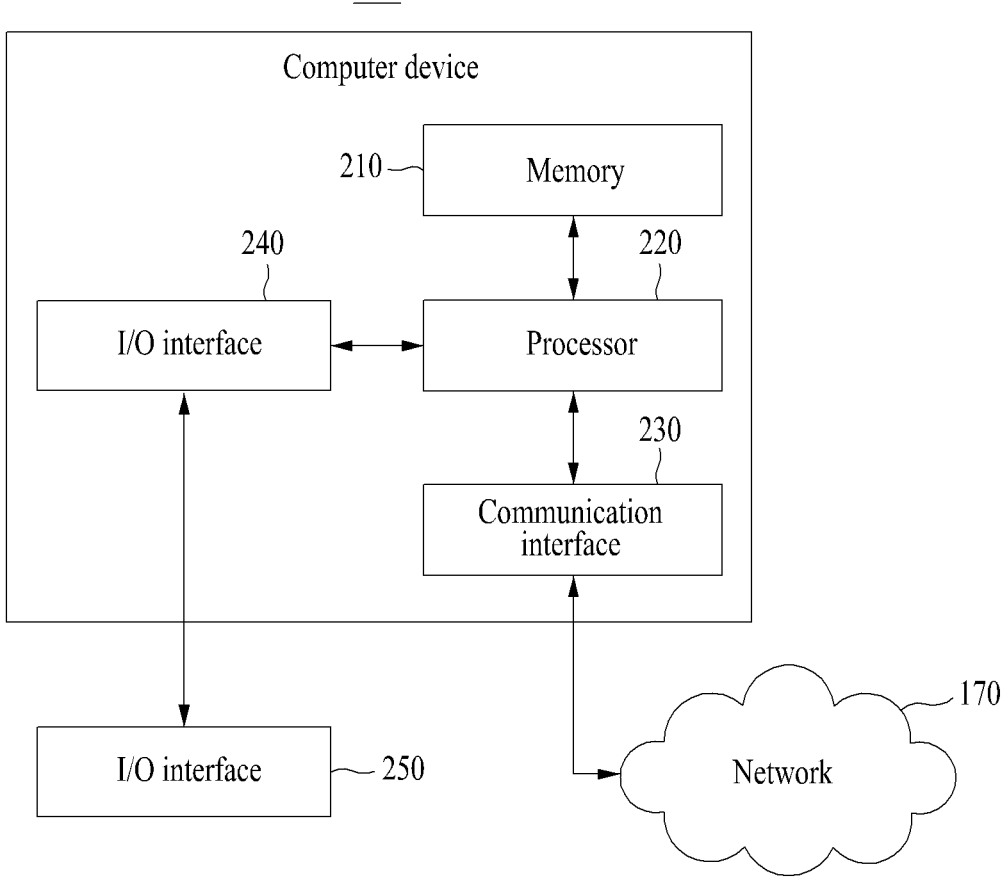
FIG. 2 is a block diagram illustrating an example of a computer device according to an example embodiment.

FIG. 2 is a block diagram illustrating an example of a computer device according to an example embodiment. Each of the plurality of electronic devices 110, 120, 130, and 140 or each of the servers 150 and 160 described above may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another computer-readable recording medium separate from the memory 210. The other computer-readable recording medium may include a computer-readable recording medium, for example, a floppy drive, a disk, a tape, a DVD/CD-ROM drive, a memory card, etc. According to other example embodiments, software components may be loaded to the memory 210 through the communication interface 230, instead of the computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication device 200 and another apparatus (e.g., the aforementioned storage devices) over the network 170. For example, the processor 220 of the computer device 200 may deliver a request or an instruction created based on a program code stored in the storage device such as the memory 210, data, and a file, to other apparatuses over the network 170 under the control of the communication interface 230. Inversely, a signal, an instruction, data, a file, etc., from another apparatus may be received at the computer device 200 through the network 170 and the communication interface 230 of the computer device 200. For example, a signal, an instruction, data, etc., received through the communication interface 230 may be delivered to the processor 220 or the memory 210, and a file, etc., may be stored in a storage medium (e.g., the permanent storage device) further includable in the computer device 200.

The I/O interface 240 may be a device used for interfacing with an I/O device 250. For example, an input device of the I/O device 250 may include a device, such as a microphone, a keyboard, a mouse, etc., and an output device of the I/O device 250 may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include greater or less number of components than the number of components shown in FIG. 2. For example, the computer device 200 may include at least a portion of the I/O device 250, or may further include other components, for example, a transceiver, a database, etc.

Figure 3:
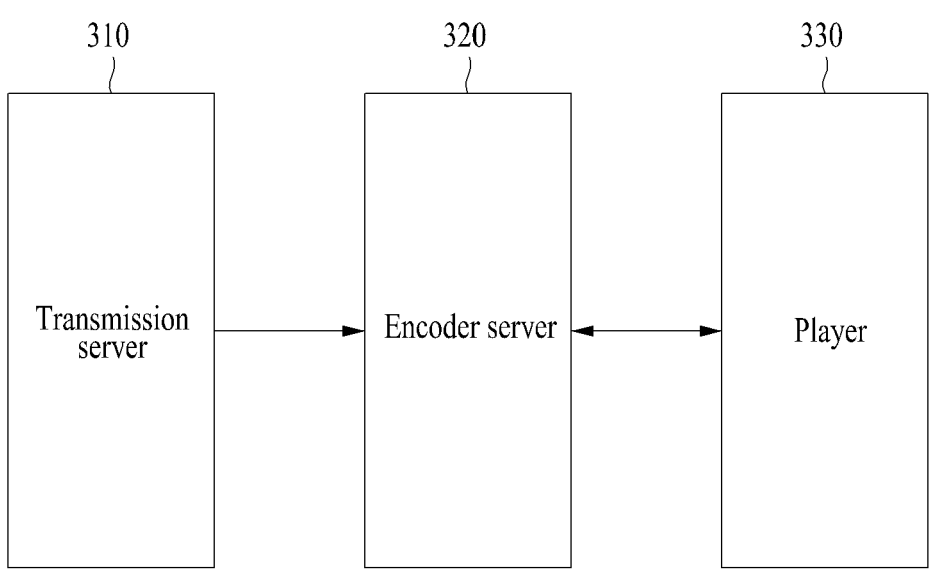
FIG. 3 is a diagram illustrating an example of a process of providing a video service according to an example embodiment.

FIG. 3 is a diagram illustrating an example of a process of providing a video service according to an example embodiment.

FIG. 3 illustrates a transmission server 310, an encoder server 320, and a player 330. Here, the transmission server 310 and the encoder server 320 may be software modules installed and running on a server device, such as the servers 150, 160, to provide a video service. Also, the player 330 may be a software module installed and running on a terminal device, such as the electronic devices 110, 120, 130, 140, of a user to playback a moving picture. Here, the software module may correspond to a computer program installed and running on the computer device 200.

Figure 4:
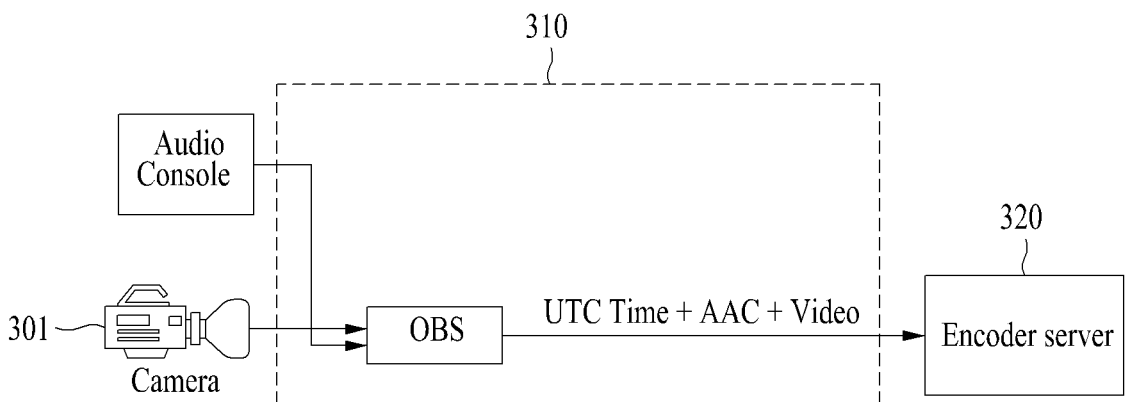
FIG. 4 illustrates an example of a single transmission environment according to an example embodiment.

Referring to FIG. 4, the transmission server 310 is a server device that serves to transmit a video and may include, for example, an open broadcaster software (OBS) module for recording and transmission. In one embodiment, the transmission server 310 may be implemented in a single transmission environment in which video is transmitted using one camera, as opposed to a multiple transmission environment in which video is transmitted using multiple cameras. Thus, FIG. 4 illustrates the transmission server 310 in a single transmission environment receiving a video captured through a single camera 301 through a single channel and transmitting the same to the encoder server 320.

Regardless of a camera, an audio channel may use the same input and an audio may also use a single channel of audio.

In particular, to provide a high-definition video at a relatively low bitrate in the single transmission environment implemented with the single camera 301, the transmission server 310 may reconstruct a video in which an ROI of a video to be transmitted is constructed as a high-definition video and a remaining region is constructed as a low-definition video. The reconstructed video is then transmitted to the encoder server 320 using a single stream, i.e., one data set in a continuous or consecutive sequence of data items or elements. Transmission information to the encoder server 320 may include coordinate information on a high-definition region and the reconstructed video.

Figure 5:
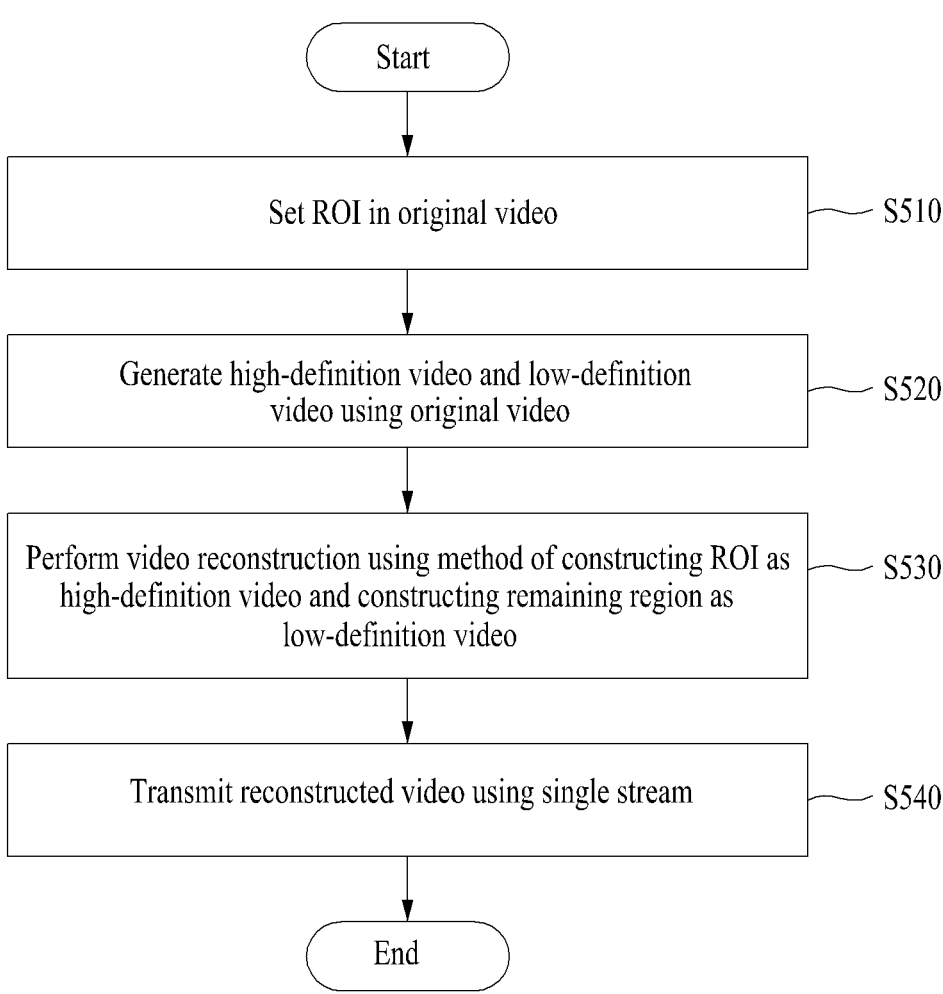
FIG. 5 is a flowchart illustrating an example of a video providing method according to an example embodiment.

FIG. 5 is a flowchart illustrating an example of a video providing method according to an example embodiment.

The video providing method according to the example embodiment may be performed by the computer device 200 that implements the aforementioned transmission server 310. In this case, the processor 220 of the computer device 200 may be implemented to execute a control instruction according to a code of at least one program or a code of an OS included in the memory 210. Here, the processor 220 may control the computer device 200 to perform operations S510 to S540 included in the method of FIG. 5 according to control instructions provided from the code stored in the computer device 200.

In operation S510, the computer device 200 may set an ROI in an original video captured through a single camera. The ROI may be directly set by a manager, that is, a transmitter, i.e., a user or person, on the side of the transmission server 310 using a manual setting method. Depending on example embodiments, a region with a predetermined size corresponding to a camera focusing location may be automatically set as the ROI. As another example, the computer device 200 may automatically set the ROI based on an object detection result through an object detection algorithm. For example, a region of a predetermined size including a corresponding object may be set as an ROI by detecting an object of a predetermined category or type.

In operation S520, the computer device 200 may generate a high-definition video and a low-definition video using the original video. The computer device 200 may generate the high-definition video and the low-definition video through scaling of the original video. Here, the computer device 200 may determine a resolution of the high-definition video that is a first resolution and a resolution of the low-definition video that is a second resolution less than the first resolution based on a maximum resolution of the transmission video. The computer device 200 may use a video of the first resolution as the high-definition video and a video of the second resolution as the low-definition video by downscaling the original video as the first resolution and the second resolution, respectively.

In operation S530, the computer device 200 may reconstruct the original video using the high-definition video and the low-definition video. The computer device 200 may reconstruct a single video by extracting a portion corresponding to the ROI from the high-definition video and by extracting a portion corresponding to the remaining region from the low-definition video. That is, the computer device 200 may perform video reconstruction using a method of constructing the ROI as the high-definition video and constructing the remaining region as the low-definition video.

In operation S540, the computer device 200 may transmit the reconstructed video using a single stream. The computer device 200 may transmit, to the encoder server 320, the video in which only the ROI is reconstructed in high definition as a final transmission video using a single stream in a single transmission environment.

FIGS. 6 to 9 illustrate examples of describing a video reconstruction process according to an example embodiment.

Figure 6:
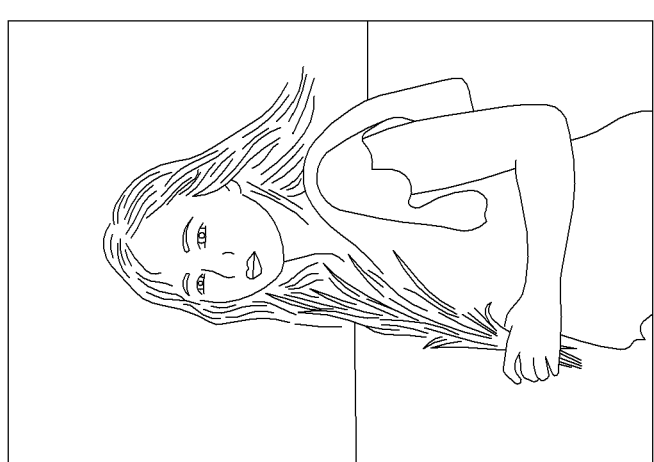
FIGS. 6 to 9 illustrate examples of describing a video reconstruction process according to an example embodiment.
Figure 6:
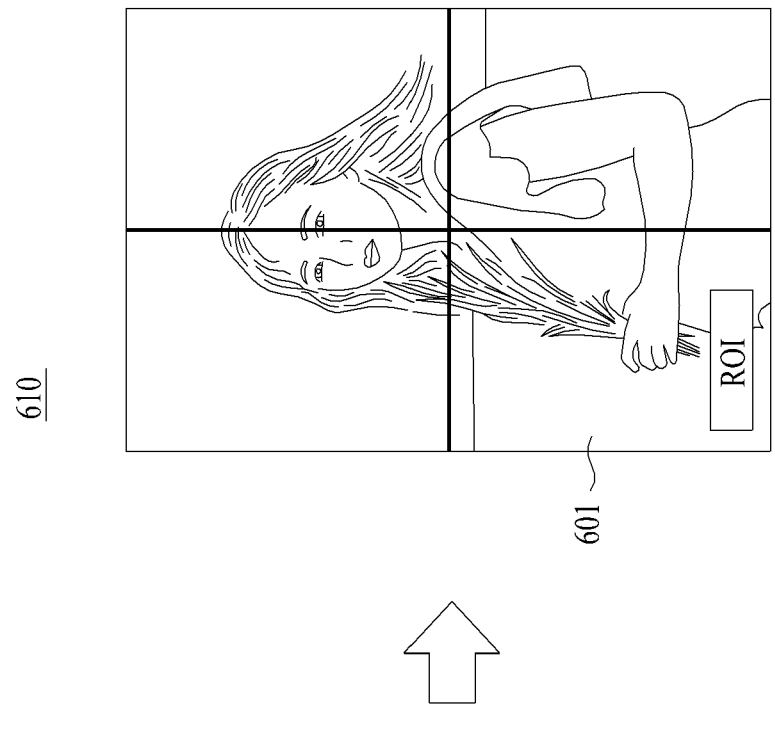

Referring to FIG. 6, the computer device 200 may provide an original video 600 as a video (hereinafter, "grid video"

610) in a grid form in which the video is segmented into a plurality of regions by lines overlaying the images of the video and may set a specific region selected from the grid video as an ROI 601.

The computer device 200 may output the grid video 610 that allows a selection of a partial region in a UI/UX manner and may set a region desired by a transmitter in the grid video 610 as the ROI 601.

The grid video 610 may be provided in a predetermined grid form and, for example, may be provided as a 2-grid video that is segmented into two regions, a 4-grid video that is segmented into four regions, and a 9-grid video that is segmented into nine regions.

A grid form to provide the grid video 610 may be determined as default, or a grid form selected by the transmitter from among a plurality of grid forms may be applied.

Depending on example embodiments, the grid form may be determined based on the original video 600. For example, the grid form may be differently applied based on the type of a video, the number of or locations of objects in the video, and the like.

The computer device 200 may fixedly or variably set the ROI 601 based on a region selected by the transmitter.

The computer device 200 may set a region of a location initially selected by the transmitter, for example, a lower left region as a fixed location and may set the region of the location as the ROI 601 regardless of a camera movement. That is, although a camera gaze moves, the computer device 200 may set a lower left region of the video as the ROI 601.

Depending on example embodiments, the computer device 200 may set an object within a region of a location initially selected by the transmitter as a reference object and may set the region in which the reference object is present as the ROI 601 while tracking the reference object as the camera moves. For example, when the transmitter sets a lower left region in which a bouquet is present as an initial ROI and if the bouquet is captured at an upper right end of the video as the camera moves, the ROI 601 may be changed to an upper right region.

When setting of the ROI 601 is completed, the computer device 200 may generate a high-definition video and a low-definition video using the original video 600.

It is assumed that the original video 600, that is, a video captured from a camera is 4K resolution (2160×3840).

The computer device 200 may set a maximum resolution of a transmission video and, for example, may set 1080p as the maximum resolution. This represents that a resolution of a video reconstructed as a final transmission video needs to be the same as a maximum resolution of 1080p or less than the maximum resolution of 1080p.

The computer device 200 may determine the resolution of the high-definition video and the resolution of the low-definition video based on the maximum resolution of the transmission video. The resolution of the high-definition video needs to be less than the maximum resolution of 1080p and the resolution of the low-definition video may be determined depending on a portion of a high-definition region to be assigned.

For example, referring to FIG. 6, when the lower left region is set as the ROI 601 in the grid video 610 that is segmented into four regions, a resolution of a high-definition video may be determined as 1440×2560 (grid size 720× 1280) and a resolution of a low-definition video may be determined as 960×1280 (grid size 480×640).

Figure 7:
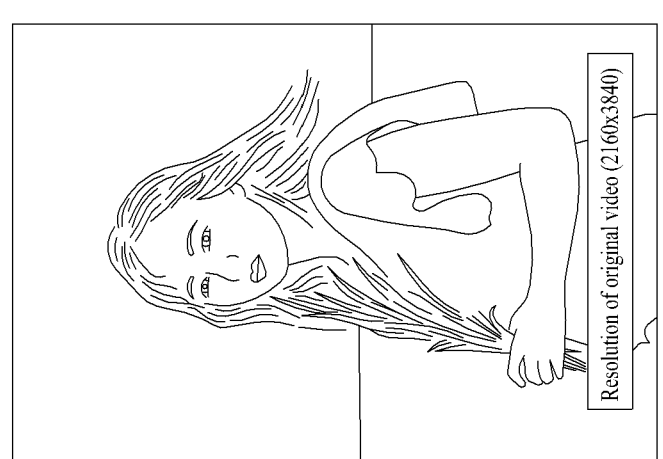
Figure 7:
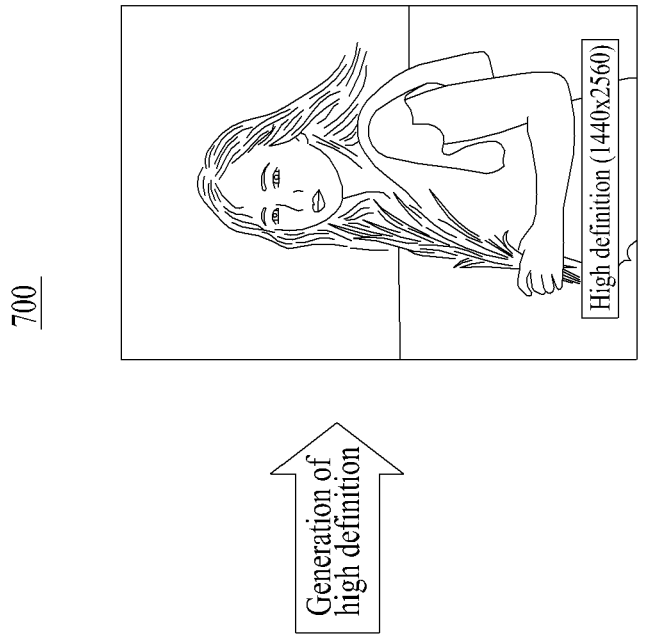

Referring to FIG. 7, the computer device 200 may generate a video 700 with a high-definition resolution of 1440× 2560 by downscaling the original video 600 with a resolution of 2160×3840.

Figure 8:
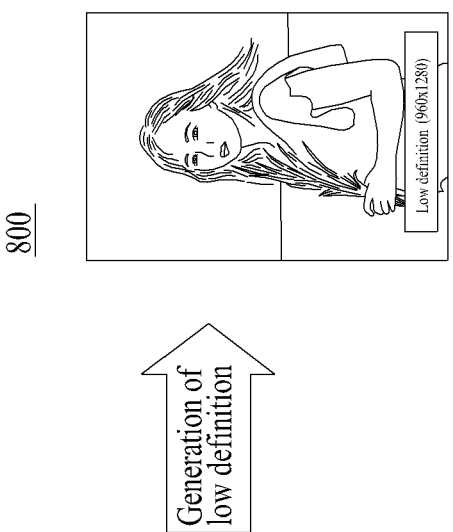
Figure 8:
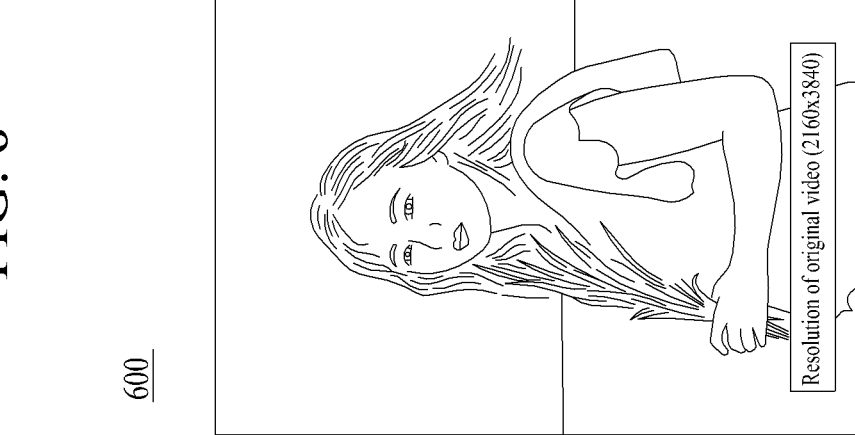

Similarly, referring to FIG. 8, the computer device 200 may generate a video 800 with a low-definition resolution of 960×1280 by downscaling the original video 600 with a resolution of 2160×3840.

Figure 9:
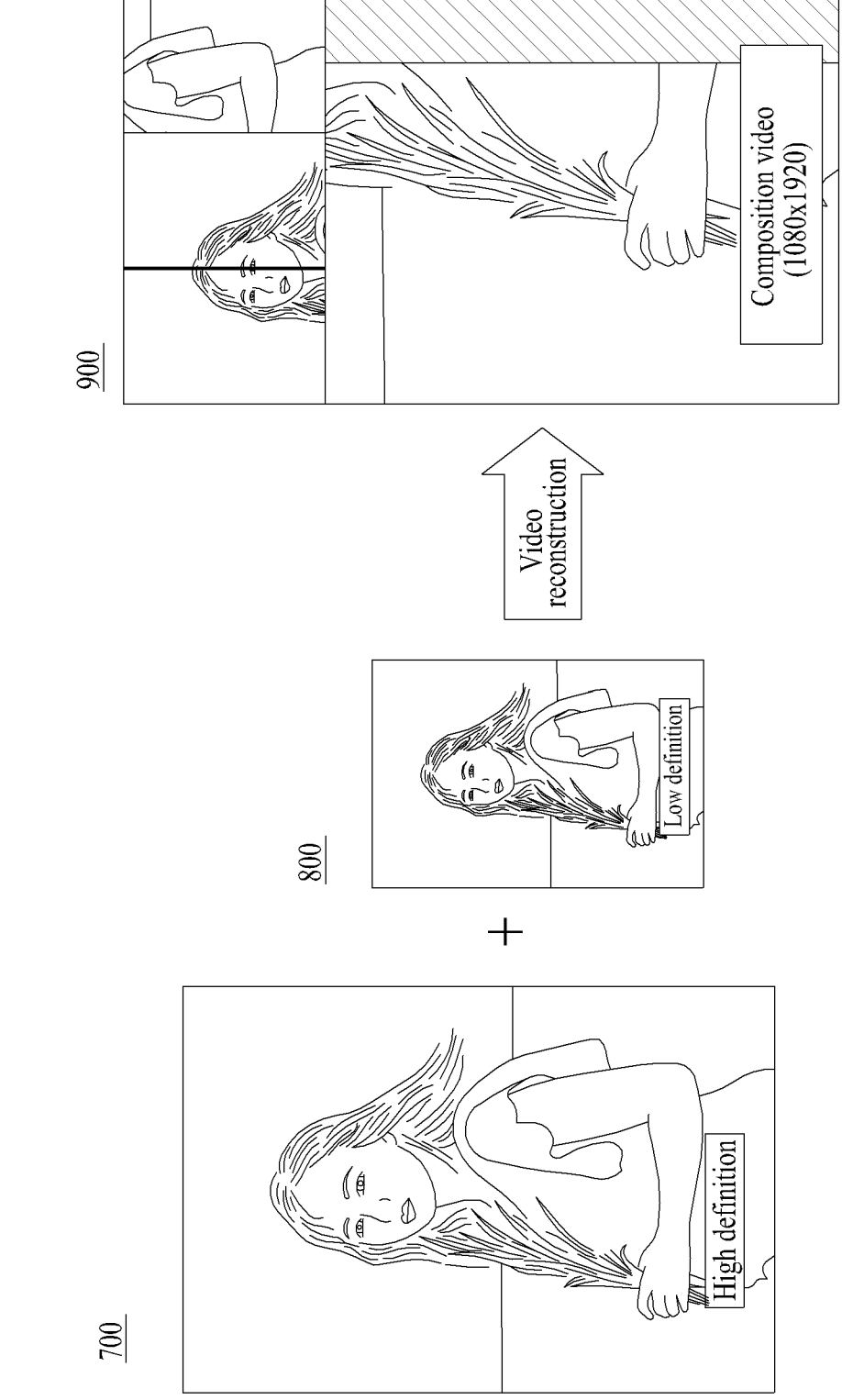

Then, referring to FIG. 9, the computer device 200 may generate a final transmission video 900 through a video reconstruction (composition) using the high-definition video 700 and the low-definition video 800 generated from the original video 600.

In detail, the computer device 200 segments the high-definition video 700 into the same grid form as that of the grid video 610 and extracts a high-definition grid region corresponding to a ROI (lower left region).

The computer device 200 segments the low-definition video 800 into the same grid form as that of the grid video 610 and extracts a low-definition grid region corresponding to a remaining region (upper left region, upper right region, lower right region) other than the ROI.

The computer device 200 may reconstruct a grid region extracted from the high-definition video 700 and a grid region extracted from the low-definition video 800 as the final transmission video 900.

Here, the total of the reconstructed final transmission video 900 may be less than or equal to the maximum resolution and the remaining region may be filled in with black.

That is, the computer device 200 may transmit, to the encoder server 320, a video in which only the ROI is reconstructed in high definition as the final transmission video 900.

The computer device 200 may generate coordinate information of the reconstructed final transmission video 900, that is, coordinate information of each of the high-definition grid region and the low-definition grid region and may transmit the coordinate information to the encoder server 320 with the final transmission video 900.

Here, the computer device 200 may simultaneously transmit the high-definition grid region and the low-definition grid region using a single stream.

Figure 10:
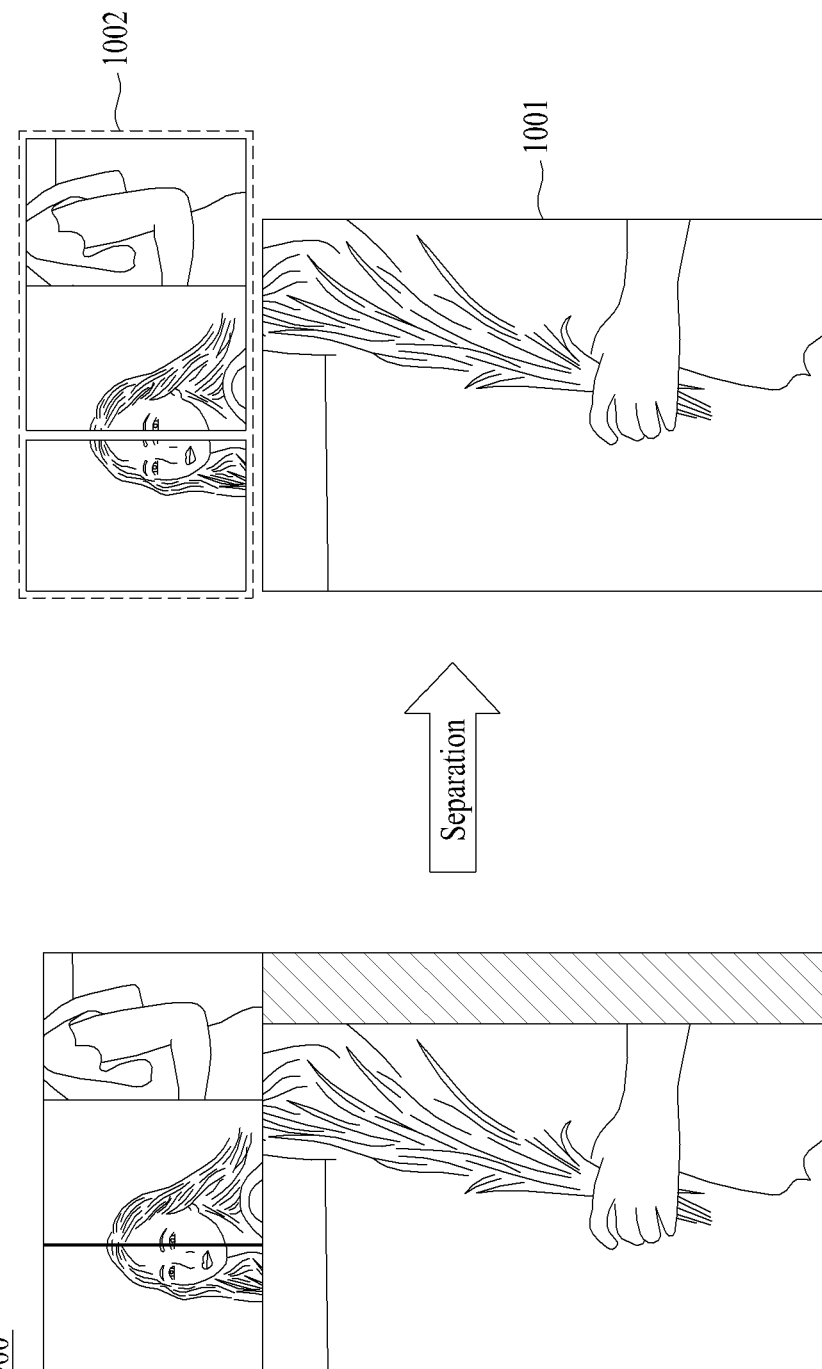
FIGS. 10 and 11 illustrate examples of describing a video playback process according to an example embodiment.
Figure 11:
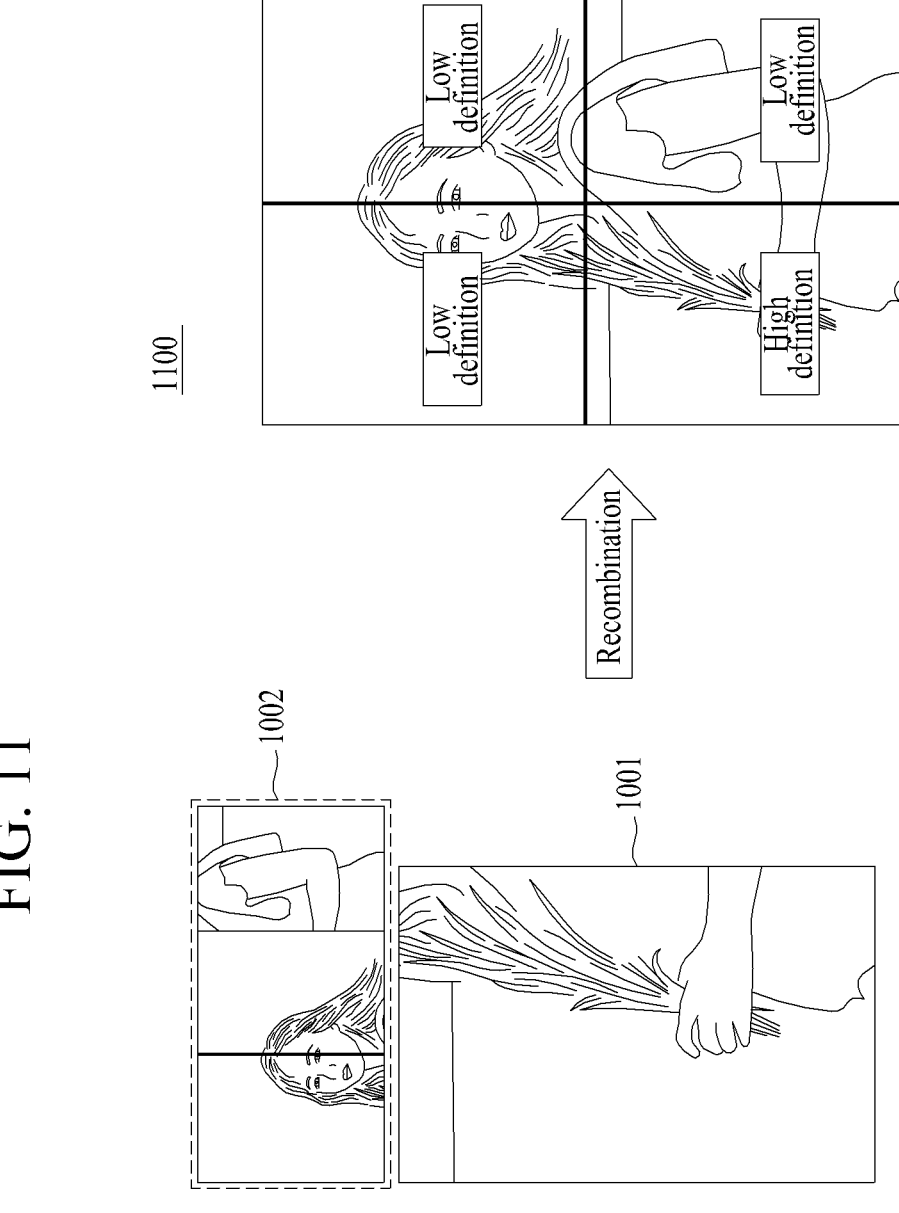

FIGS. 10 and 11 illustrate examples of describing a video playback process according to an example embodiment.

The encoder server 320 serves to relay the final transmission video 900 and the coordinate information transmitted from the transmission server 310 to the player 330.

Referring to FIG. 10, the player 330 may separate a high-definition grid region 1001 and a low-definition grid region 1002 by referring to the final transmission video 900 and the coordinate information transmitted through the encoder server 320.

The player 330 may perform postprocessing using the coordinate information capable of separating the high-definition grid region 1001 and the low-definition grid region 1002 with respect to the final transmission video 900 received from the encoder server 320. The player 330 may postprocess the final transmission video 900 using various graphics engines, for example, OpenGL, depending on a platform that provides a video.

Referring to FIG. 11, the player 330 may recombine the high-definition grid region 1001 and the low-definition grid region 1002 separated from the single stream, at the same ratio. The player 330 may play back a video 1100 recombined at the same ratio by downscaling the high-definition grid region 1001 and by upscaling the low-definition grid region 1002.

When playing back the recombined video 1100, the player 330 may output a high-definition video for a corresponding portion even when a user has enlarged a portion set as a ROI in the recombined video 1100 being played back.

As described above, according to example embodiments, since a high-definition video may be serviced at a relatively low bitrate by providing a high definition for an ROI and by providing a low definition for a remaining region other than the ROI using a single stream in a single transmission environment, it is possible to ensure quality of service (QoS) and quality of experience (QoE).

The apparatuses described herein may be implemented using hardware components, software components, and/or combination of the hardware components and the software components. For example, the apparatuses and the components described herein may be implemented using one or more computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. Here, the media may include, alone or in combination with program instructions, data files, data structures, and the like. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of other media may include record media and storage media managed by an app store that distributes applications or a site that supplies and distributes other various types of software, a server, and the like. Examples of the program instructions include a machine language code as produced by a compiler and an advanced language code executable by a computer using an interpreter.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A video providing method performed by a computer device, wherein the computer device comprises at least one processor configured to execute computer-readable instructions included in a memory, the video providing method comprising:
   providing the original video as a video in a grid form in which the video is segmented into a plurality of regions;
   setting one of the regions of the plurality of regions as a region of interest (ROI) in the original video;
   generating a high-definition video and a low-definition video using the original video;
   reconstructing, by the computer device, a single transmission video by combining a high-definition grid region corresponding to the ROI, extracted from the high definition video, with a low-definition grid region corresponding to a remaining region which includes the regions that do not include the ROI, extracted from the low-definition video; and
   transmitting the single transmission video and coordinate information to a player using a single stream,
   wherein the coordinate information enables the player to separate the single transmission video into the high-definition grid region and the low-definition grid region and to recombine the separated regions for playback.

2. The video providing method of claim 1, wherein the video providing method provides a video reconstructed using the high-definition video and the low-definition video in a single transmission environment using a single camera.

3. The video providing method of claim 1, wherein the generating of the high-definition video and the low-definition video comprises:
   setting a maximum resolution of a transmission video;
   determining a high-definition resolution and a low-definition resolution based on the maximum resolution; and
   generating a video of the high-definition resolution and a video of the low-definition resolution through scaling of the original video.

4. The video providing method of claim 1, wherein the high-definition grid region and the low-definition grid region are recombined at the same ratio and then played back in the player.

5. The video providing method of claim 1, wherein the providing of the original video in the grid form is selected by a transmission end manager from among a plurality of grid forms.

6. The video providing method of claim 1, wherein the grid form is determined based on a type of the original video or the number of or locations of objects in the original video.

7. The video providing method of claim 1, wherein a region that includes an object corresponding to a predetermined category or type through object detection for the original video is set as the ROI.

8. A non-transitory computer-readable recording medium storing a program for causing a computer to execute the video providing method of claim 1.

9. A computer device comprising:

at least one processor configured to execute computer-readable instructions included in a memory, wherein the at least one processor is configured to provide an original video as a video in a grid form in which the video is segmented into a plurality of regions;

set one of the regions of the plurality of regions as a region of interest (ROI) in the original video, constructing the region of interest (ROI) as a high definition video and a remaining region, which includes the regions that do not include the ROI, as a low-definition video using the original video, reconstruct the ROI and remaining regions other than the ROI using the high-definition video and the low-definition video, and transmit the reconstructed ROI and the remaining regions using a single stream.

10. The computer device of claim 9, wherein the at least one processor is configured to provide a video reconstructed using the high-definition video and the low-definition video in a single transmission environment using a single camera.

11. The computer device of claim 9, wherein the generating of the high-definition video and the low-definition video comprises:

setting a maximum resolution of a transmission video, determining a high-definition resolution and a low-definition resolution based on the maximum resolution, and generating a video of the high-definition resolution and a video of the low-definition resolution through a scaling of the original video.

12. The computer device of claim 9, wherein the reconstructing of the ROI and the remaining region comprises:

extract, from the high-definition video, a high-definition grid region that is a portion corresponding to the ROI;

extract, from the low-definition video, a low-definition grid region that is a portion corresponding to the remaining region, and reconstruct the high-definition grid region and the low-definition grid region as a transmission video.

13. The computer device of claim 12, wherein the reconstructing of the ROI and the remaining region further comprises:

generating coordinate information capable of distinguishing the ROI and the remaining region, and transmitting the reconstructed video and the coordinate information to an encoder server for relay to a player.

14. The computer device of claim 12, wherein the reconstructed transmission video is separated into the ROI and the remaining regions and recombined at the same ratio and then played back in the player that receives the single stream.

15. The computer device of claim 9, wherein the at least one processor is configured to determine the grid form based on a type of the original video or the number of or locations of objects in the original video.

16. The computer device of claim 9, wherein the at least one processor is configured to set, as the ROI, a region that includes an object corresponding to a predetermined category or type through object detection for the original video.

* * * * *